Feb. 10, 1931.   J. H. SHEA   1,791,980
AUTOMATIC VALVE FOR GAS LINES
Filed July 16, 1929
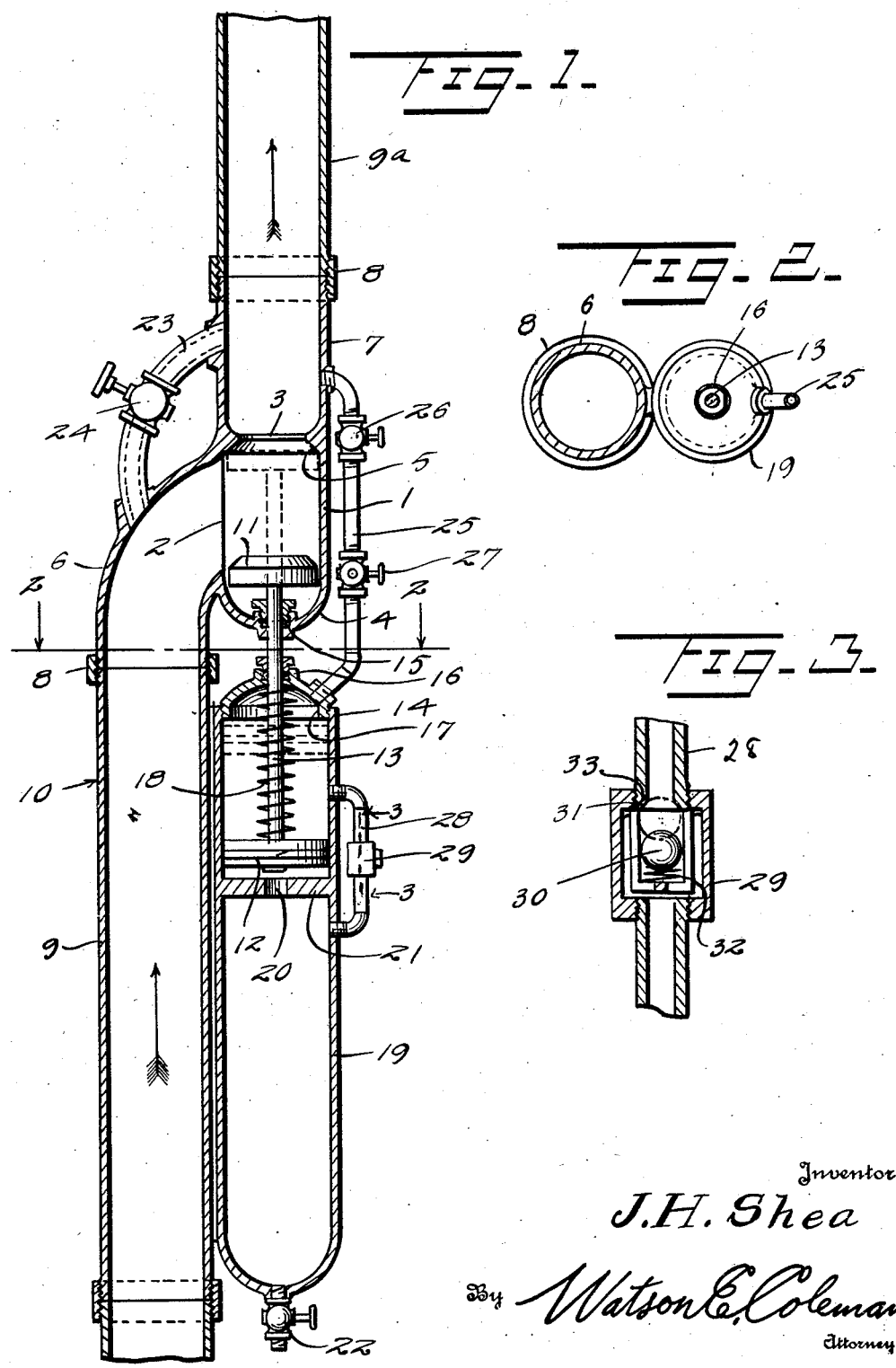
Inventor
J. H. Shea
By Watson E. Coleman
Attorney Patented Feb. 10, 1931

1,791,980

UNITED STATES PATENT OFFICE

JOHN H. SHEA, OF WESTON, WEST VIRGINIA, ASSIGNOR OF ONE-THIRD TO W. A. EDWARDS, ONE-SIXTH TO CHARLES M. SNAITH, AND ONE-SIXTH TO JOHN COLLINS, ALL OF WESTON, WEST VIRGINIA

AUTOMATIC VALVE FOR GAS LINES

Application filed July 16, 1929. Serial No. 378,730.

This invention relates to a valve for gas mains or lines, and has for one of its objects to provide a valve which shall be adapted under normal conditions of the main or line to permit the free and unobstructed flow of the gas therethrough and which on the breaking of the main or line in advance thereof shall be adapted to automatically close to prevent the passage of the gas to the broken portion of the main or line.

The invention has for a further object to provide an automatic valve of the character stated which shall be adapted to be held opened by the pressure of the gas in the main or line, which shall on the breaking of the main or line be adapted to be held closed by the pressure of the gas in the unbroken portion of the main or line, and which shall be provided with means adapted to permit the pressure of the gas in the unbroken portion of the main or line to be utilized for the purpose of opening it after the broken portion of the main or line has been repaired or replaced.

The invention has for a still further object to provide an automatic valve of the character stated which shall be simple and durable and capable of being manufactured and sold at a comparatively low cost, and which shall be adapted to be readily installed in the main or line.

With the foregoing and other objects in view, the nature of which will appear as the description proceeds, the invention consists in the construction, combination and arrangement of parts hereinafter fully described and claimed and illustrated in the accompanying drawing, wherein:—

Figure 1 is a sectional view taken on a horizontal plane extending centrally and longitudinally through a portion of a gas main or line and through the automatic valve;

Figure 2 is a sectional view taken on the plane indicated by the line 2—2 of Figure 1; and Figure 3 is a sectional view on an enlarged scale on the plane indicated by the line 3—3 of Figure 1.

The valve comprises a casing 1 of cylindrical formation and provided at its side with an inlet port 2 and at its front end with an outlet port 3. The casing 1 is closed at its rear end, as at 4, and it is provided at its outlet port 3 with a rearwardly facing valve seat 5. The casing 1 is provided with a coupling extension 6 communicating with the inlet port 2, and it is provided with a coupling extension 7 communicating with the outlet port 3. The extension 6 is arranged in parallel and the extension 7 in axial relation to the casing 1. The extensions 6 and 7 are connected by couplings 8 to the contiguous ends of adjacent sections 9 and 9$^a$ of the gas main or line 10, and they establish such a communication between the casing 1 and the main or line sections that the gas in flowing from the section 9 to the section 9$^a$ passes through the casing.

A piston actuated valve head 11 is slidably arranged within the casing 1 for movement toward and away from the valve seat 5. When the valve head 11 is seated, it cuts off communication between the main or line sections 9 and 9$^a$, and it is held in position by the pressure of the gas in the main or line section 9. When the valve head 11 is in unseated or opened position, the greater portion thereof is located rearwardly beyond the inlet port 2, with the result that it will not interfere with the passage of the gas through the casing 1. The valve head 11 is shown in closed position by broken lines and in opened position by solid lines.

The piston 12 is connected to the valve head 11 by a rod 13. It is slidably mounted in a cylinder 14 which is arranged in axial alinement with and rearwardly of the casing 1. The rod 13 passes through a stuffing box 15 carried by the rear head 4 of the casing 1 and through a stuffing box 16 carried by the front head 17 of the cylinder 14. A spiral spring 18, mounted upon the rod 13 between the piston 12 and the cylinder head 17, tends to move the valve head 11 in the direction of its opened position.

A pressure reservoir 19 is arranged in axial alinement with and rearwardly of the cylinder 14. Communication between the adjacent ends of these parts is established by way of a port 20 in the cylinder head 21. The rear end of the pressure reservoir 19 is provided with a drain or vent valve 22.

A pipe 23, which is provided with a cutoff valve 24, communicates at its ends with the coupling extensions 6 and 7, and serves when this valve is opened, to by-pass gas from the coupling extension 6 to the coupling extension 7.

A pipe 25 extends from the coupling extension 7 to the head 17 of the cylinder 14, and is provided with a cutoff valve 26 and a drain or vent valve 27. When the valve 26 is opened and the valve 27 closed, the pipe 25 conveys gas from the coupling extension 7 to the cylinder 14 at a point forwardly beyond the piston 12. A pipe 28, which is provided with a check valve 29, communicates at its ends with the cylinder 14 and the pressure reservoir 19, and serves to convey gas from the cylinder to the reservoir. The ball 30 of the check valve 29 seats in a direction to prevent the passage of gas from the pressure reservoir 19 to the cylinder 14 by way of the pipe 28, and it is yieldingly held in contact with its seat 31 by a spring 32. The check valve 29 is provided with a small port 33 for a purpose to be presently set forth.

In practice, when the gas main or line 10 is in normal condition, the valve head 11 is in opened position, the valves 24 and 27 are closed, and the valve 26 is opened. The gas flows through the main or line 10 and through the valve casing 1 in the direction indicated by the arrows of Figure 1. As the cylinder 14 is in communication, at a point forwardly beyond the piston 12, with the main or line 10 by way of the coupling extension 7 and the pipe 25, and as the cylinder is in communication at a point forwardly beyond the piston, with the pressure reservoir 19 by way of the pipe 28, the pressure in the cylinder at both sides of the piston is equal and equal to the pressure in the main or line 10, with the result that the spring 18 will maintain the valve head 11 in opened position.

In the event of a break occurring in the main or line 10 at a point forwardly beyond the valve, the pressure in the main or line and in the cylinder 14 forwardly beyond the piston 12 will decrease, but the pressure in the reservoir 19 will not decrease due to the action of the check valve 29 and to the fact that the piston has a gas-tight connection with the cylinder. The higher pressure in the reservoir 19 will act against the piston 12 and move the valve head 11 into closed position against its seat 12, with the result that the flow of gas to the broken portion of the main or line will be cut off. As the pipe 25 communicates with the main or line 10 at a point beyond the closed valve head 11, the valve head will remain closed until after the break has been repaired and the valve 24 opened. Before opening the valve 24, the valve 26 is closed and the valve 27 is opened, the opening of the latter valve relieving the cylinder of any pressure beyond the piston 12. After the valve 27 has been closed and the valves 24 and 26 opened, the gas will flow by the closed valve head 11 by way of the pipe 23, and as the pressure in the main or line builds up, the gas will flow by way of the pipe 25 into the cylinder 14. When the pressure in the cylinder becomes greater than that in the reservoir 19, the piston 12 will be moved in a direction to open the valve head 11. In order to permit the rapid building up of the pressure in the cylinder 14, the valve 22 is opened and after the opening of the valve head 11, the valve 22 is closed. When the pressure is equal on both sides of the piston 12, the valve head 11 will be held in opened position and thereafter the valve 24 is closed.

The valve is capable of being controlled manually to effect the closing of the valve head 11 before a break occurs in the main or line section 9ª. To effect this closing of the valve head 11, it is only necessary to close the valve 26 and open the valve 27, and to effect the opening of the valve head 11, it is only necessary to open the valve 26 and close the valve 27. The port 33 in the valve seat 31 permits gas in the reservoir 19 to leak past the closed valve 30 into the cylinder 14 when the pressure in the cylinder falls below that in the reservoir as the result of the lowering of the pressure in the main or line 10 while the valve head 11 is in opened position, with the result that fluctuations in the main or line pressure before a break occurs in the main or line section 9ª will not cause the opening and closing of the valve head 11.

The cylinder 14 and pressure reservoir 19 may be strapped, welded or secured to the main or line 10 in any other suitable manner. The valve 22 may also be used for the purpose of draining any water that may accumulate in the pressure reservoir 19.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A valve for a gas line, comprising a casing having inlet and outlet coupling members adapted to be connected to the line, a valve seat within the casing between the coupling members, a valve head slidably mounted in the casing, a cylinder, a piston slidably arranged in the cylinder, a rod connecting the valve head to the piston, a spring normally urging the valve head in the direction of its opened position, a pipe communicating with the line and with the cylinder forwardly beyond the piston, a pressure reservoir communicating with the cylinder rearwardly of the piston, a pipe communicating with the reservoir and with the cylinder forwardly beyond the piston when the valve head is in opened position, and a check valve in said last pipe and provided with a port leading to the cylinder.

2. A valve for a gas line, comprising a casing having inlet and outlet coupling members adapted to be connected to the line, a valve seat within the casing between the coupling members, a valve head slidably mounted in the casing, a cylinder, a piston slidably arranged in the cylinder, a rod connecting the valve head to the piston, a spring normally urging the valve head in the direction of its opened position, a pipe communicating with the line and with the cylinder forwardly beyond the piston, a pressure reservoir communicating with the cylinder rearwardly of the piston, a pipe communicating with the reservoir and with the cylinder forwardly beyond the piston when the valve head is in opened position, a cutoff valve in said first pipe, and a check valve in said second pipe.

3. A valve for a gas line, comprising a casing having inlet and outlet coupling members adapted to be connected to the line, a valve seat within the casing between the coupling members, a valve head slidably mounted in the casing, a cylinder, a piston slidably arranged in the cylinder, a rod connecting the valve head to the piston, a spring normally urging the valve head in the direction of its opened position, a pipe communicating with the line and with the cylinder forwardly beyond the piston, a pressure reservoir communicating with the cylinder rearwardly of the piston, a pipe communicating with the reservoir and with the cylinder forwardly beyond the piston when the valve head is in opened position, a cut off valve and a vent valve in said first pipe, and a check valve in said second pipe.

4. A valve for a gas line, comprising a casing having inlet and outlet coupling members adapted to be connected to the line, a valve seat within the casing between the coupling members, a valve head slidably mounted in the casing, a cylinder, a piston slidably arranged in the cylinder, a rod connecting the valve head to the piston, a spring normally urging the valve head in the direction of its opened position, a pipe communicating with the line and with the cylinder forwardly beyond the piston, a pressure reservoir communicating with the cylinder rearwardly of the piston, a pipe communicating with the reservoir and with the cylinder forwardly beyond the piston when the valve head is in opened position, a pipe communicating with the coupling members and provided with a cutoff valve, a cutoff valve and a vent valve in said first pipe, and a check valve in said second pipe and provided with a port leading to the cylinder.

5. A valve for a gas line, comprising a casing having inlet and outlet coupling members adapted to be connected to the line, a valve seat within the casing between the coupling members, a by-pass passage communicating with the coupling members and provided with a cutoff valve, a valve head slidably mounted in the casing, a cylinder, a pressure reservoir communicating with one end of the cylinder, a pipe communicating with the outlet coupling member and with the other end of the cylinder, a piston slidably mounted in the cylinder and connected to the valve head, a spring arranged between said other end of the cylinder and the piston, a pipe communicating with the reservoir and with the cylinder at a point beyond the piston when the valve head is in opened position, and a check valve in said last pipe.

6. A valve for a gas line, comprising a casing having inlet and outlet coupling members adapted to be connected to the line, a valve seat within the casing between the coupling members, a valve head slidably mounted in the casing, a cylinder, a piston slidably arranged in the cylinder, a rod connecting the valve head to the piston, a spring normally urging the valve head in the direction of its opened position, a pipe communicating with the line and with the cylinder forwardly beyond the piston, a pressure reservoir communicating with the cylinder rearwardly of the piston, a pipe communicating with the reservoir and with the cylinder forwardly beyond the piston when the valve head is in opened position, and a check valve in said last pipe and provided with a leakage port.

In testimony whereof I hereunto affix my signature.

JOHN H. SHEA.